United States Patent
Huang et al.

(10) Patent No.: US 8,494,032 B2
(45) Date of Patent: Jul. 23, 2013

(54) NETWORK COMMUNICATIONS DEVICE CAPABLE OF PROMOTING CONNECTION QUALITY AND METHOD THEREOF

(75) Inventors: Liang-wei Huang, Taipei (TW);
Chun-Wen Yeh, Taipei County (TW);
Chien-Sheng Lee, Miaoli County (TW);
Tsung-Cheng Lee, Yunlin County (TW)

(73) Assignee: Realteck Semiconductor Corp., Hsinchu (TW)

( * ) Notice: Subject to any disclaimer, the term of this patent is extended or adjusted under 35 U.S.C. 154(b) by 838 days.

(21) Appl. No.: 12/579,458

(22) Filed: Oct. 15, 2009

(65) Prior Publication Data
US 2010/0098140 A1 Apr. 22, 2010

(30) Foreign Application Priority Data
Oct. 17, 2008 (TW) .............................. 97139916 A

(51) Int. Cl.
*H04B 1/38* (2006.01)
(52) U.S. Cl.
USPC ........... 375/219; 375/220; 375/221; 375/222; 375/295; 375/316
(58) Field of Classification Search
USPC ................. 375/219, 220, 221, 222, 229, 254, 375/285, 295, 316, 340, 346
See application file for complete search history.

(56) References Cited

U.S. PATENT DOCUMENTS

| | | | |
|---|---|---|---|
| 6,807,228 B2 | 10/2004 | Agazzi et al. | |
| 7,561,633 B2 * | 7/2009 | Parhi et al. | 375/267 |
| 7,936,778 B2 | 5/2011 | Ungerboeck et al. | |
| 8,184,567 B2 * | 5/2012 | Huang et al. | 370/311 |
| 2004/0213170 A1 * | 10/2004 | Bremer | 370/282 |
| 2007/0111687 A1 * | 5/2007 | Weng et al. | 455/127.5 |
| 2007/0167184 A1 | 7/2007 | Lee et al. | |
| 2009/0282277 A1 * | 11/2009 | Sedarat et al. | 713/320 |
| 2009/0291632 A1 * | 11/2009 | Braithwaite et al. | 455/7 |
| 2011/0150067 A1 * | 6/2011 | Takada | 375/227 |
| 2012/0257691 A1 * | 10/2012 | Ginis et al. | 375/296 |

FOREIGN PATENT DOCUMENTS
CN 1941649 4/2007

* cited by examiner

*Primary Examiner* — Hirdepal Singh
(74) *Attorney, Agent, or Firm* — Birch, Stewart, Kolasch & Birch, LLP

(57) ABSTRACT

A network communications device is capable of promoting connection quality, and includes: a plurality of transmitting units for outputting a plurality of analog transmit-signals to another network communications device based on a plurality of digital transmit-signals; a plurality of receiving units for outputting a plurality of digital receive-signals based on a plurality of analog receive-signals sent from the another network communications device; an echo canceller for providing a signal for canceling an echo in one of the digital receive-signals; a near end crosstalk canceller for providing a signal for canceling near end crosstalk in one of the digital receive-signals; a decoding circuit for generating a decoded signal based on one of the digital receive-signals subsequent to cancellation of the echo and the near end crosstalk therein; and a power-increasing control circuit for increasing operating power so as to promote connection quality.

32 Claims, 5 Drawing Sheets

NETWORK COMMUNICATIONS DEVICE CAPABLE OF PROMOTING CONNECTION QUALITY AND METHOD THEREOF

CROSS-REFERENCE TO RELATED APPLICATION

This application claims priority of Taiwanese application no. 097139916, filed on Oct. 17, 2008.

BACKGROUND OF THE INVENTION

1. Field of the Invention

This invention relates to communications technology, more particularly to a network communications device capable of promoting connection quality and method thereof.

2. Description of the Related Art

Ethernet standards typically specify a connection quality associated with a network cable length of 100 meters between communications devices. However, to facilitate extension of the network cable beyond 100 meters, a longer network cable, such as one measuring 150 meters, is usually paired with the network cable in order to serve as a transmission interface. In addition, network cable of poor quality is sometimes chosen so as to lower costs. Consequently, the quality of a connection between the communications devices gradually decreases in accordance with increases in network cable length or reductions in quality of the network cable, such that the connection quality eventually fails to conform with Ethernet standards.

SUMMARY OF THE INVENTION

Therefore, an object of the present invention is to provide a network communications device capable of promoting connection quality and method thereof that ensure a desired connection quality despite use of a network cable exceeding a standard length or a network cable of poor quality.

According to the present invention, there is provided a network communications device capable of promoting connection quality. The network communications device comprises a plurality of transmitting units, a plurality of receiving units, an echo canceller, a near end crosstalk canceller, a decoding circuit, and a power-increasing control circuit. The plurality of transmitting units comprises a first transmitting unit and (n) transmitting units. The first transmitting unit is for outputting a first analog transmit-signal to another network communications device based on a first digital transmit-signal. The (n) transmitting units are for outputting (n) analog transmit-signals to the another network communications device based on (n) digital transmit-signals, wherein (n) is a positive integer. The plurality of receiving units comprises a first receiving unit and (m) receiving units. The first receiving unit is for outputting a first digital receive-signal based on a first analog receive-signal sent from the another network communications device. The (m) receiving units are for outputting (m) digital receive-signals based on (m) analog receive-signals sent from the another network communications device, wherein (m) is a positive integer. The echo canceller is for providing an echo canceling signal based on the first digital transmit-signal so as to cancel an echo in the first digital receive-signal. The near end crosstalk canceller is for providing a near end crosstalk canceling signal based on the (n) digital transmit-signals so as to cancel near end crosstalk in the first digital receive-signal. The decoding circuit is for generating a decoded signal based on the first digital receive-signal subsequent to cancellation of the echo and the near end crosstalk therein. The power-increasing control circuit is for increasing operating power of the network communications device based on the first digital receive-signal so as to promote connection quality.

According to another aspect of the present invention, there is provided a network communications method capable of promoting connection quality and adapted for a network communications device. The network communications method comprises the following steps:

(A) outputting a first analog transmit-signal to another network communications device based on a first digital transmit-signal;

(B) outputting (n) analog transmit-signals to said another network communications device based on (n) digital transmit-signals, wherein (n) is a positive integer;

(C) outputting a first digital receive-signal based on a first analog receive-signal sent from said another network communications device;

(D) outputting (m) digital receive-signals based on (m) analog receive-signals sent from said another network communications device, wherein (m) is a positive integer;

(E) providing an echo canceling signal based on the first digital transmit-signal for canceling an echo in the first digital receive-signal;

(F) providing a near end crosstalk canceling signal based on the (n) digital transmit-signals for canceling near end crosstalk in the first digital receive-signal;

(G) generating a decoded signal based on the first digital receive-signal subsequent to cancellation of the echo and the near end crosstalk in the first digital receive-signal; and (H) increasing operating power of the network communications device based on the first digital receive-signal so as to promote connection quality.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
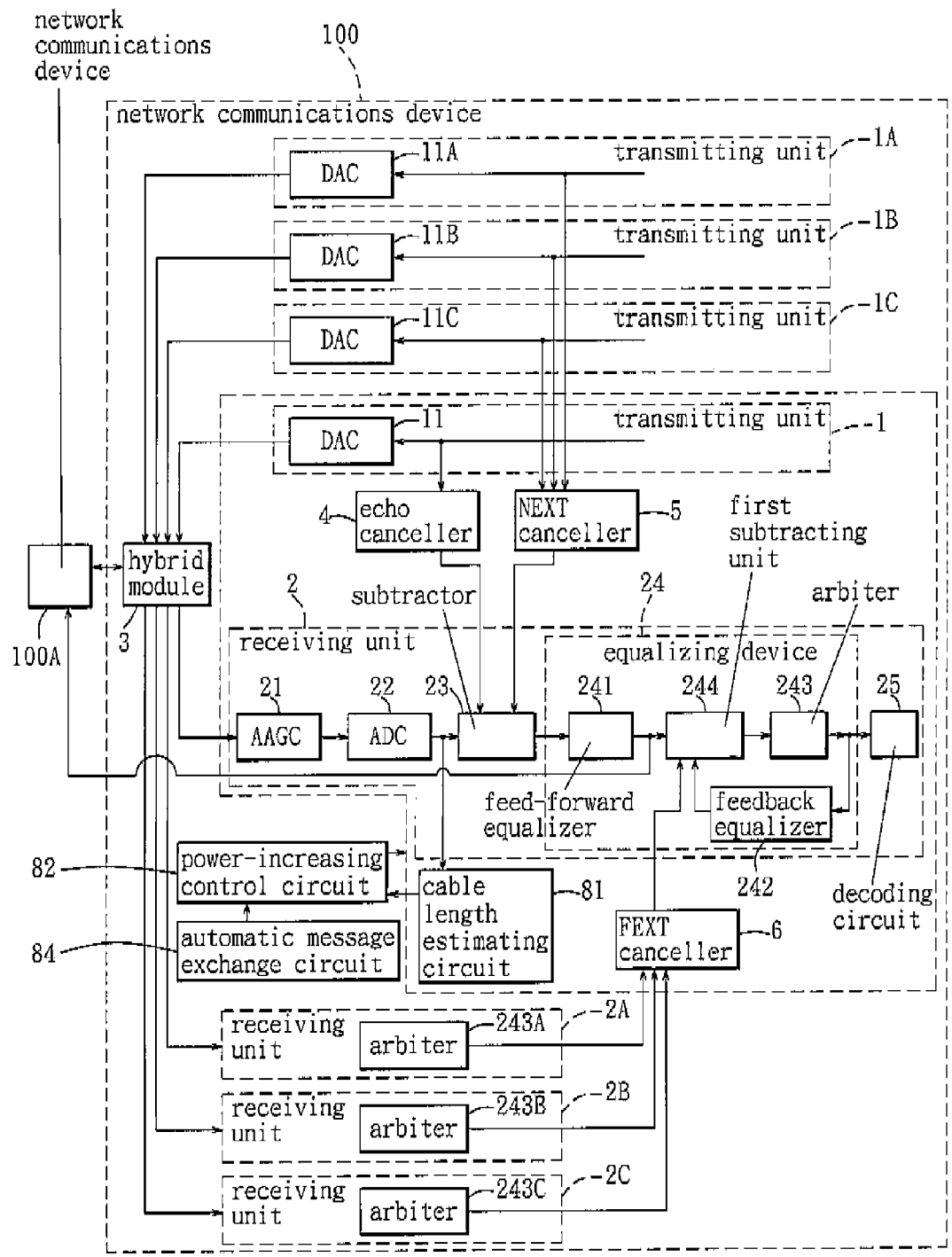
FIG. 1 is a schematic system block diagram of a first preferred embodiment of a network communications device capable of promoting connection quality according to the present invention.

Before the present invention is described in greater detail with reference to the accompanying preferred embodiments, it should be noted herein that like elements are denoted by the same reference numerals throughout the disclosure.

FIG. 1 illustrates the first preferred embodiment of the network communications device 100 capable of promoting connection quality according to the present invention. The network communications device 100 is adapted for exchanging data with another network communications device 100A through a network cable. In this embodiment, the network communications device 100 includes a plurality of transmitting units 1, 1A, 1B, 1C, a plurality of receiving units 2, 2A, 2B, 2C, a hybrid module 3 coupled to the transmitting units 1, 1A, 1B, 1C and to the receiving units 2, 2A, 2B, 2C, an echo canceller 4 coupled to one of the transmitting units 1, a near-end crosstalk (NEXT) canceller 5 coupled to others of the transmitting units 1A, 1B, 1C, a far-end crosstalk (FEXT) canceller 6 coupled to the receiving units 2A, 2B, 2C, a cable length estimating circuit 81 coupled to another of the receiving units 2, a power-increasing control circuit 82 coupled to the cable length estimating circuit 81, and an automatic message exchange circuit 84 coupled to the power-increasing control circuit 82.

In this embodiment, each of the transmitting units 1, 1A, 1B, 1C includes a digital-to-analog converter (DAC) 11, 11A, 11B, 11C, and the another of the receiving units 2 includes an analog automatic gain controller (AAGC) 21, an analog-to-digital converter (ADC) 22 coupled to the AAGC 21, a subtractor 23 coupled to the ADC 22, the echo canceller 4 and the NEXT canceller 5, an equalizing device 24 coupled to the subtractor 23 and the FEXT canceller 6, and a decoding circuit 25 coupled to the equalizing device 24. The equalizing device 24 includes a feed-forward equalizer 241, a first subtracting unit 244 coupled to the feed-forward equalizer 241 and the FEXT canceller 6, an arbiter 243 coupled to the first subtracting unit 244, and a feedback equalizer 242 coupled to the arbiter 243 and the first subtracting unit 244.

Each of the transmitting units 1, 1A, 1B, 1C generates a digital transmit-signal, which the DAC 11, 11A, 11B, 11C then converts into an analog transmit-signal. The analog transmit-signal is then provided to the hybrid module 3 for subsequent transmission through the network cable as network data. In addition, the echo canceller 4 performs computation of a plurality of taps based on the digital transmit-signal from the one of the transmitting units 1 (that is, a first digital transmit-signal from a first transmitting unit), and outputs an echo canceling signal. The NEXT canceller 5 performs computation of a plurality of taps based on the digital transmit-signals generated by the others of the transmitting units 1A, 1B, 1C and outputs a near end crosstalk canceling signal.

The hybrid module 3 extracts a plurality of analog receive-signals from the network data transmitted through the network cable. The AAGC 21 receives one of the analog receive-signals (that is, a first analog receive-signal) from the hybrid module 3 and performs automatic gain adjustment thereon. The ADC 22 then converts the adjusted signal into a first digital receive-signal. The subtractor 23 then subtracts the echo canceling signal and the near end crosstalk canceling signal from the first digital receive-signal so as to remove echo and near end crosstalk therein, and generates an output.

At the same time, others of the analog receive-signals are received by the receiving units 2A, 2B, 2C, and the receiving units 2A, 2B, 2C output digital receive-signals in accordance with the others of the analog receive-signals. The FEXT canceller 6 is controlled by arbiters 243A, 243B, 243C of the receiving units 2A, 2B, 2C to perform computation of a plurality of taps so as to generate a far end crosstalk canceling signal.

The equalizing device 24 of the receiving unit 2 then outputs an equalized signal based on the output from the subtractor 23 and the far end crosstalk canceling signal, which is then provided to the decoding circuit 25 for outputting a decoded signal. The decoding circuit 25 thus generates the decoded signal based on the first digital receive-signal subsequent to cancellation of the echo, the near end crosstalk, and the far end crosstalk therein.

Figure 2:
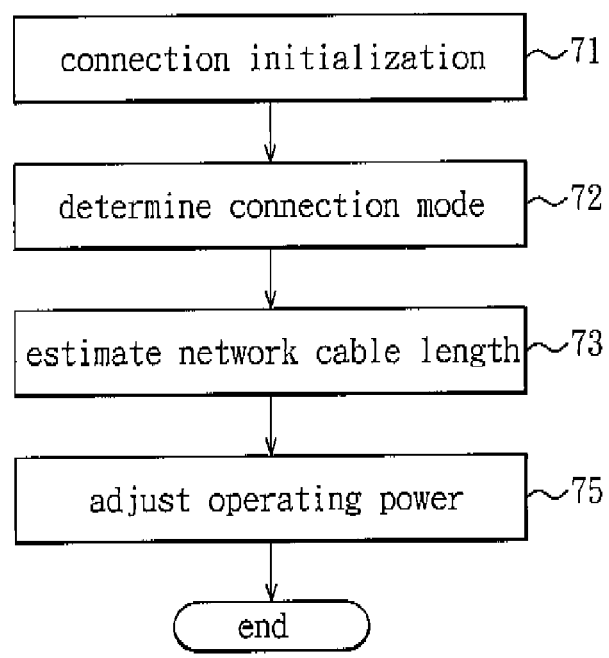
FIG. 2 is a flowchart to illustrate a first preferred embodiment of a method for promoting connection quality according to the present invention.

In order to ensure maintenance of connection quality, the network communications device 100 performs a method for promoting connection quality, in which the power-increasing control circuit 82 is able to effectively estimate a transmission distance between the network communications devices 100, 100A based on the first digital receive-signal, and to increase operating power of the network communications device 100 when appropriate so as to promote connection quality. The method comprises the following steps as shown in FIG. 2.

In step 71, the network communications device 100 performs connection initialization with the other network communications device 100A through the network cable, during which the network communications device 100 obtains a connection capacity (that is, a highest rate at which data is transmitted/received) of the other network communications device 100A.

In step 72, the automatic message exchange circuit 84 determines a suitable connection mode based on the connection capacity, wherein the connection mode is one of a 10 Megabits per second data transmission rate mode (a 10 M mode), a 100 Megabits per second data transmission rate mode (a 100 M mode), a 1 Gigabits per second data transmission rate mode (a 1 G mode), a 10 Gigabits per second data transmission rate mode (a 10 G mode), and an above 10 Gigabits per second data transmission rate mode (an above 10 G mode), including data transmission rates such as 40 Gigabits per second or 100 Gigabits per second. For realization of the automatic message exchange circuit 84, one can refer to U.S. Pat. No. RE39,116, as well as to U.S. Pat. No. RE39,405.

In step 73, the cable length estimating circuit 81 estimates the transmission distance (that is, a network cable length) between the network communications device 100 and the other network communications device 100A based on channel response from an output end of the ADC 22 so as to generate an estimation result (that is, an estimation of the network cable length).

In step 75, the power-increasing control circuit 82 determines adjustment of the operating power of a number of analog circuits or digital circuits of the network communications device 100 based on the connection mode and the estimation of the network cable length so as to promote connection quality. Adjustment of the analog circuits is directed to the DAC 11 and the ADC 22, and adjustment of the digital circuits is directed to the echo canceller 4, the NEXT canceller 5, the FEXT canceller 6 and the decoding circuit 25. In this embodiment, the digital circuits 4-6, 25 are preset to be in an enabled state.

Figure 3:
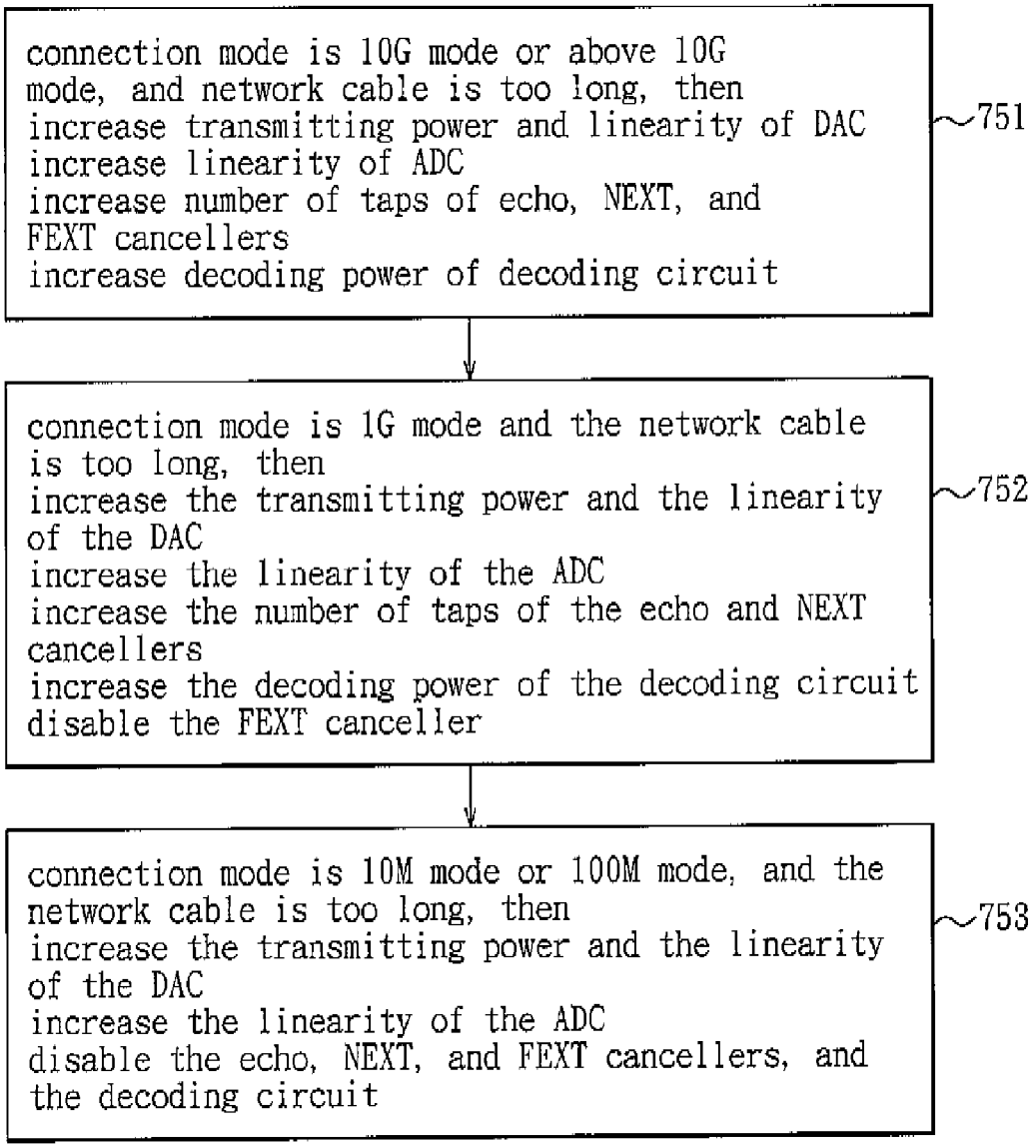
FIG. 3 is a flowchart to illustrate a method by which a power-increasing control circuit of the network communications device increases operating power based on a connection mode and an estimated network cable length.

Step 75 includes the following sub-steps as shown in FIG. 3.

In sub-step 751, when it is determined that the connection mode of the network communications device 100 is the 10 G mode or the above 10 G mode, and the estimation of the network cable length is greater than a predetermined value, such as 100 meters, it is presumed that the connection quality does not conform with communications standard specifications. In response, the power-increasing control circuit 82 increases a digital-to-analog conversion reference voltage value so as to increase transmitting power of the DAC 11, increases an analog-to-digital conversion reference current value so as to increase linearity of the DAC 11, and increases another reference current value so as to increase the linearity of the ADC 22. In regard to the digital circuits 4-6, 25, the power-increasing control circuit 82 increases a number of operating taps of the cancellers 4-6, and increases decoding power of the decoding circuit 25.

It is worth noting that the greater the power increase received by the circuits 4-6, 11, 22, 25, the greater the improvement in the connection quality. In addition, the network communications device 100 capable of supporting the 10 G connection mode typically uses a low-density parity-check (LDPC) code decoding circuit 25, in which the decoding power increases in accordance with increases in iteration count.

In sub-step 752, when it is determined that the connection mode of the network communications device 100 is the 1 G mode, and the estimation of the network cable length is greater than the predetermined value, it is presumed that the connection quality does not conform with the communications standard specifications. In response, the power-increasing control circuit 82 disables computational power of the FEXT canceller 6, and adjusts the operating power of remaining circuits 4, 5, 11, 22, 25 in the manner described in sub-step 751. The reason for disabling the computational power of the FEXT canceller 6 is that under present conditions, a level of FEXT interference is so low as to be negligible.

It is worth noting that the network communications device 100 capable of supporting the 1 G connection mode typically uses a Viterbi decoder as the decoding circuit 25, in which the decoding power increases as trace back length increases.

In sub-step 753, when it is determined that the connection mode of the network communications device 100 is the 10 M mode or the 100 M mode, and the estimation of the network cable length is greater than the predetermined value, it is presumed that the connection quality does not conform with the communications standard specifications. In response, the power-increasing control circuit 82 disables the digital circuits 4-6, 25, and adjusts the operating power of the analog circuits 11,22 in the manner described in sub-step 751.

The rationale for disabling the FEXT canceller 6 is that the level of FEXT interference in the 10 M and 100 M connection modes is so low as to be negligible. Similarly, the echo canceller 4 and the NEXT canceller 5 can be disabled on account of negligible levels of echo and NEXT interference in the 10 M and 100 M connection modes. Low levels of echo and NEXT interference are attributable to the fact that in the 10 M and 100 M connection modes, the network communications device 100 uses only one of two twisted pair cables in the network cable for data transmission. Consequently, echo and NEXT interference requiring cancellation are not generated. On the other hand, when the network communications device 100 operates in the 10, the 10 G, or the above 10 G connection mode, both twisted pair cables are used at the same time, generating echo and NEXT interference that require operation of the cancellers 4, 5, which is supported through power increases performed in sub-steps 751, 752. Moreover, data transmitted by the network communications device 100 operating in the 10 M or 100 M connection mode usually does not contain channel coded messages, and consequently does not require recovery by the decoding circuit 25.

It is worth noting that steps 72, 73 can be performed in reverse order or simultaneously. In addition, the sequence of sub-steps 751-753 is not limited to what is described above, as long as the steps achieve adjustments corresponding to each of the connection modes.

In another implementation, the digital circuits 4-6, that are adjusted can be preset to be in a disabled state, and subsequent enabling of the digital circuits 4-6, 25 can be dependent on performance of sub-steps 751-753.

Moreover, in step 75, a greater number of distinct predetermined values can be provided for selection in order to define more ranges representing the network cable length. When the estimation of the network cable length falls in a range representing a comparatively greater network cable length, a measure by which power is increased by the power-increasing control circuit 82 becomes greater.

Figure 4:
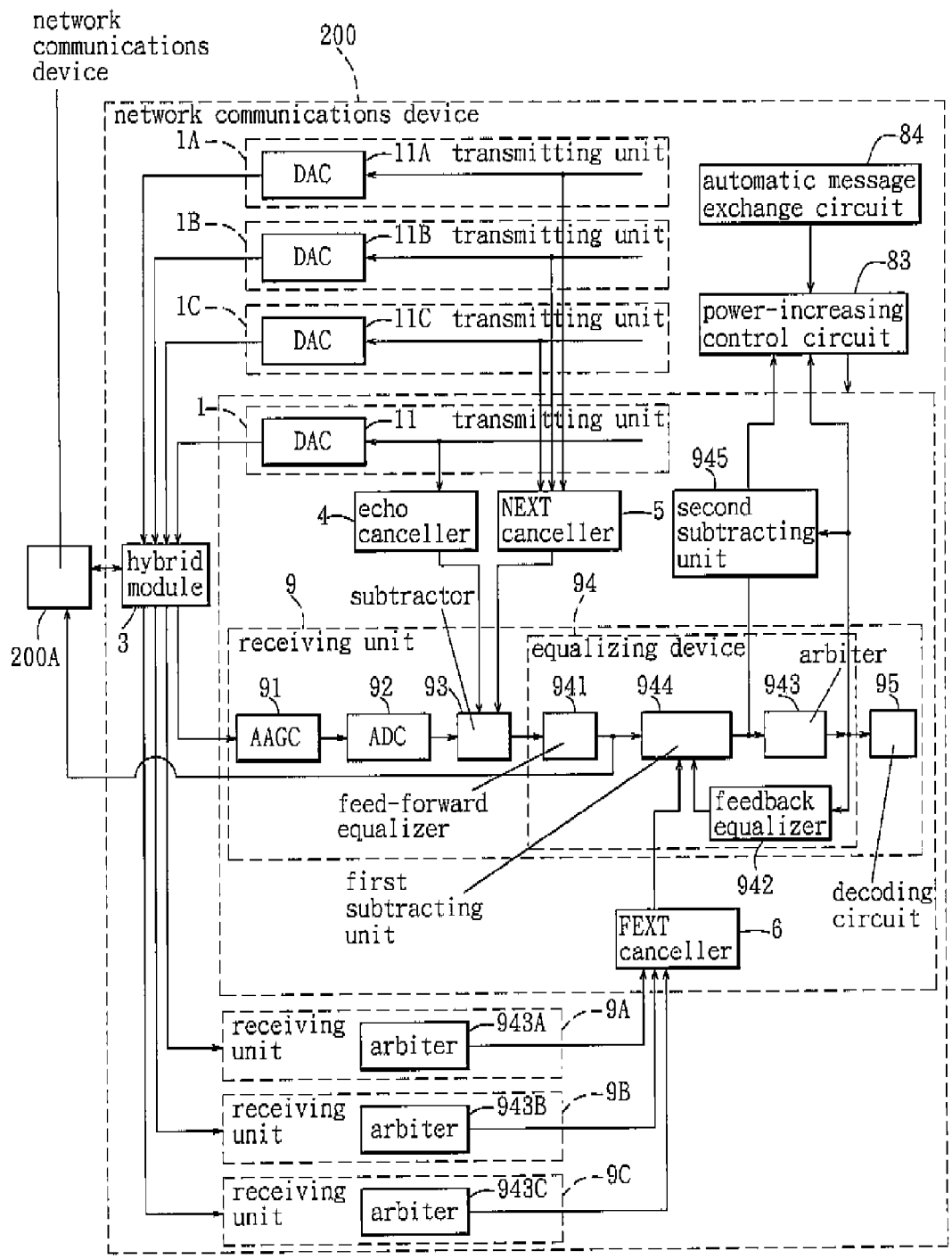
FIG. 4 is a schematic system block diagram of a second preferred embodiment of a network communications device capable of promoting connection quality according to the present invention.

Referring to FIG. 4, the second preferred embodiment of the network communications device 200 capable of promoting connection quality of this invention differs from the first preferred embodiment with respect to conditions under which the power-increasing control circuit 83 adjusts the operating power of the circuits. In this embodiment, the cable length estimating circuit 81 for estimating the network cable length is omitted, and adjustment of the operating power is instead performed based on a receive-signal index associated with the equalizing device 94 of the receiving unit 9. The receive-signal index is a signal-to-noise ratio (SNR), bit error rate or other measure indicative of receive-signal quality. In this embodiment, only the signal-to-noise ratio is illustrated. A method by which the signal-to-noise ratio is obtained is described below.

In the equalizing device 94, the feed-forward equalizer 941 receives output from the subtractor 93, performs feed-forward equalization accordingly, and generates a feed forward signal. The first subtracting unit 944, in order to remove the far end crosstalk from the first digital receive-signal, subtracts the far end crosstalk canceling signal and output from the feedback equalizer 942 from the feed-forward signal so as to generate an output. The arbiter 943 receives the output from the first subtracting unit 944 and extracts an equalized signal. The feedback equalizer 942 performs feedback equalization processing based on the equalized signal and generates an output. Since feed-forward and feedback equalization processing are techniques belonging to the prior art, they are not described herein for the sake of brevity.

The second subtracting unit 945 computes a difference between the output from the first subtracting unit 944 and the equalized signal extracted by the arbiter 943. The power-increasing control circuit 83 then obtains the signal-to-noise ratio of the equalizing device 94 based on the computed difference and the equalized signal. Variation of the signal-to-noise ratio can be attributed to excess network cable length, to poor network cable quality (poor transmission conditions), or another cause.

Figure 5:
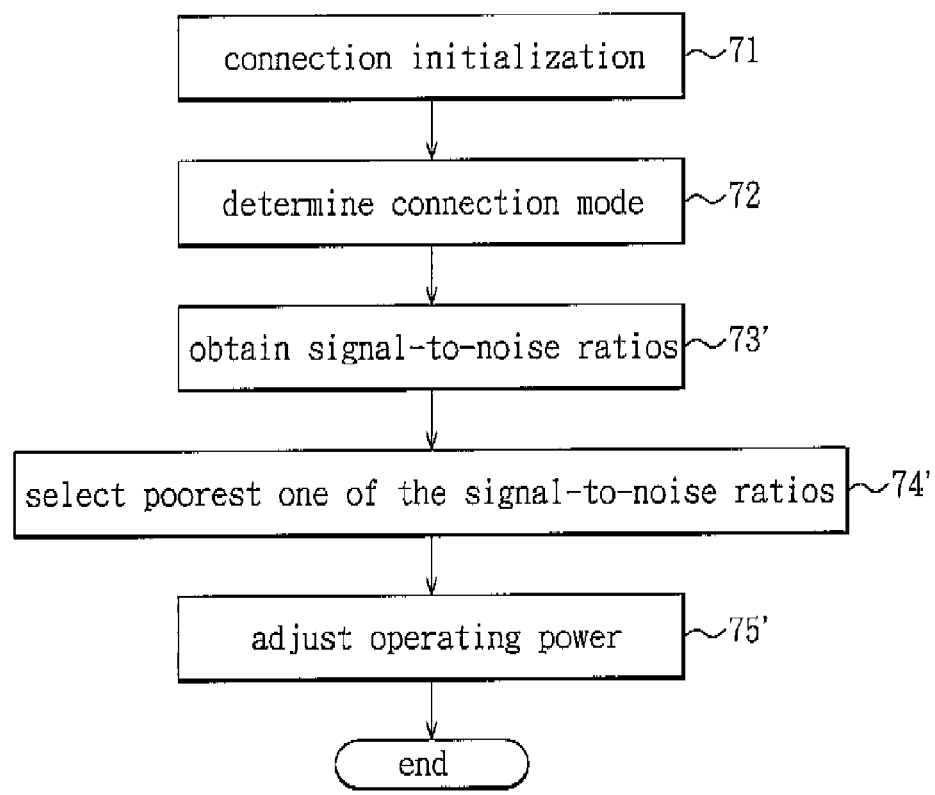
FIG. 5 is a flowchart to illustrate a second preferred embodiment of a method for promoting connection quality according to the present invention.

Referring to FIG. 5, the second preferred embodiment of the method for promoting connection quality according to the present invention differs from the first preferred embodiment with respect to steps 73-75 as follows.

In step 73', the power-increasing control circuit 83 obtains a first signal-to-noise ratio through a fourth signal-to-noise ratio associated respectively with the receiving units 9, 9A, 9B, 9C in accordance with the above-described signal-to-noise ratio obtaining method.

In step 74', the power-increasing control circuit 83 selects a poorest one of the signal-to-noise ratios. For example, when the signal quality of the first digital receive-signal is a poorest signal quality in comparison with those of the other digital receive-signals, the power-increasing control circuit 83 selects the first signal-to-noise ratio, and increases the operating power of the network communications device 200 based on the poorest signal quality of the first digital receive-signal.

In step 75', the power-increasing control circuit 83 determines adjustment of the operating power of a number of the analog circuits 11, 22 or the digital circuits 4-6, 25 based on the connection mode and the selected signal-to-noise ratio. Each of sub-steps of step 75' concerns adjustment of the operating power of the circuits 4-6, 11, 22, 25 following selection of a signal-to-noise ratio that is less than a predetermined quality value (that is, not conforming to a quality reference range) by the power-increasing control circuit 83, and presumption that the connection quality does not conform with the communications standard specifications.

Clearly, a greater number of distinct predetermined quality values can be used to define more ranges of signal-to-noise ratios, wherein when the selected signal-to-noise ratio falls within a range representing a comparatively higher signal-to-noise ratio, a measure by which the power-increasing control circuit 83 increases power becomes greater. Moreover, a node from which the power-increasing control circuit 83 obtains the signal-to-noise ratio is not limited to what is described above. Any node responsive to present connection quality can be used.

In addition, although in the above-described embodiments, three of the others of the transmitting units 1A-1C as well as three of the receiving units 2A-2C, 9A-9C are used, in practice, the number of transmitting/receiving units is not limited, as long as the number is a positive integer.

In sum, when the network cable length exceeds a standard length or the network cable fails to provide an adequate transmission environment, the network communications device 100, 200 of the present invention adjusts the operating power of the digital and/or analog circuits 4-6, 11, 22, 25, 92, 95 based on an estimation of the network cable length or the receive-signal index so as to promote connection quality.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A network communications device capable of promoting connection quality, and comprising:
    a plurality of transmitting units, comprising:
        a first transmitting unit for outputting a first analog transmit-signal to another network communications device based on a first digital transmit-signal; and
        (n) transmitting units for outputting (n) analog transmit-signals to said another network communications device based on (n) digital transmit-signals, wherein (n) is a positive integer;
    a plurality of receiving units, comprising:
        a first receiving unit for outputting a first digital receive-signal based on a first analog receive-signal sent from said another network communications device; and
        (m) receiving units for outputting (m) digital receive-signals based on (m) analog receive-signals sent from said another network communications device, wherein (m) is a positive integer;
    an echo canceller for providing an echo canceling signal based on the first digital transmit-signal so as to cancel an echo in the first digital receive-signal;
    a near end crosstalk canceller for providing a near end crosstalk canceling signal based on the (n) digital transmit-signals so as to cancel near end crosstalk in the first digital receive-signal;
    a decoding circuit for generating a decoded signal based on the first digital receive-signal subsequent to cancellation of the echo and the near end crosstalk therein;
    a power-increasing control circuit for increasing operating power of said network communications device based on the first digital receive-signal so as to promote connection quality; and
    a far end crosstalk canceller for providing a far end crosstalk canceling signal based on the (m) digital receive-signals so as to cancel far end crosstalk in the first digital receive-signal;
    wherein said decoding circuit generates the decoded signal based on the first digital receive-signal subsequent to cancellation of the echo, the near end crosstalk and the far end crosstalk in the first digital receive-signal.

2. The network communications device as claimed in claim 1, wherein said power-increasing control circuit increases the operating power of said plurality of transmitting units so as to promote connection quality.

3. The network communications device as claimed in claim 2, wherein said power-increasing control circuit increases a digital-to-analog conversion reference voltage value of said plurality of transmitting units so as to promote connection quality.

4. The network communications device as claimed in claim 1, wherein said power-increasing control circuit increases the operating power of said plurality of receiving units so as to promote connection quality.

5. The network communications device as claimed in claim 4, wherein said power-increasing control circuit increases an analog-to-digital conversion reference current value of said plurality of receiving units so as to promote connection quality.

6. The network communications device as claimed in claim 1, wherein said power-increasing control circuit increases the operating power of at least one of said echo canceller and said near end crosstalk canceller so as to promote connection quality.

7. The network communications device as claimed in claim 6, wherein said power-increasing control circuit increases a number of operating taps of at least one of said echo canceller and said near end crosstalk canceller so as to promote connection quality.

8. The network communications device as claimed in claim 1, wherein said power-increasing control circuit increases the operating power of said decoding circuit so as to promote connection quality.

9. The network communications device as claimed in claim 1, further comprising:
    a cable length estimating circuit for estimating a cable length of a connecting cable between said network communications device and said another network communications device, and generating an estimation result;
    wherein said power-increasing control circuit increases the operating power of said network communications device based on said estimation result so as to promote connection quality.

10. The network communications device as claimed in claim 1, wherein said power-increasing control circuit obtains a first signal-to-noise ratio based on the first digital receive-signal, said power-increasing control circuit subsequently increasing the operating power of said network communications device based on the first signal-to-noise ratio so as to promote connection quality.

11. The network communications device as claimed in claim 1, wherein said network communications device supports data transmission rates of 10 Gigabits per second or higher.

12. The network communications device as claimed in claim 1, wherein a cable length of a connecting cable between said network communications device and said another network communications device is greater than one hundred meters.

13. The network communications device as claimed in claim 1, wherein when a signal quality of the first digital receive-signal is a poorest signal quality in comparison with the (m) digital receive-signals, said power-increasing control circuit increases the operating power of said network communications device based on the poorest signal quality of the first digital receive-signal so as to promote connection quality.

14. The network communications device as claimed in claim 1, wherein (n) and (m) are both equal to three.

15. A network communications device capable of promoting connection quality, and comprising:
- a plurality of transmitting units, comprising:
  - a first transmitting unit for outputting a first analog transmit-signal to another network communications device based on a first digital transmit-signal; and
  - (n) transmitting units for outputting (n) analog transmit-signals to said another network communications device based on (n) digital transmit-signals, wherein (n) is a positive integer;
- a plurality of receiving units, comprising:
  - a first receiving unit for outputting a first digital receive-signal based on a first analog receive-signal sent from said another network communications device; and
  - (m) receiving units for outputting (m) digital receive-signals based on (m) analog receive-signals sent from said another network communications device, wherein (m) is a positive integer;
- an echo canceller for providing an echo canceling signal based on the first digital transmit-signal so as to cancel an echo in the first digital receive-signal;
- a near end crosstalk canceller for providing a near end crosstalk canceling signal based on the (n) digital transmit-signals so as to cancel near end crosstalk in the first digital receive-signal;
- a decoding circuit for generating a decoded signal based on the first digital receive-signal subsequent to cancellation of the echo and the near end crosstalk therein;
- a power-increasing control circuit for increasing operating power of said network communications device based on the first digital receive-signal so as to promote connection quality; and
- an automatic message exchange circuit for confirming a transmitting/receiving power of said another network communications device so as to determine a connection mode;
- wherein said power-increasing control circuit increases the operating power of said network communications device based on said connection mode and the first digital receive-signal so as to promote connection quality.

16. The network communications device as claimed in claim 15, wherein said connection mode is one of a 10 Megabits per second data transmission rate mode, a 100 Megabits per second data transmission rate mode, a 1 Gigabits per second data transmission rate mode, a 10 Gigabits per second data transmission rate mode, and an above 10 Gigabits per second data transmission rate mode.

17. A network communications method capable of promoting connection quality and adapted for a network communications device, said network communications method comprising the following steps:
- (A) outputting a first analog transmit-signal to another network communications device based on a first digital transmit-signal;
- (B) outputting (n) analog transmit-signals to said another network communications device based on (n) digital transmit-signals, wherein (n) is a positive integer;
- (C) outputting a first digital receive-signal based on a first analog receive-signal sent from said another network communications device;
- (D) outputting (m) digital receive-signals based on (m) analog receive-signals sent from said another network communications device, wherein (m) is a positive integer;
- (E) providing an echo canceling signal based on the first digital transmit-signal for canceling an echo in the first digital receive-signal;
- (F) providing a near end crosstalk canceling signal based on the (n) digital transmit-signals for canceling near end crosstalk in the first digital receive-signal;
- (G) generating a decoded signal based on the first digital receive-signal subsequent to cancellation of the echo and the near end crosstalk in the first digital receive-signal;
- (H) increasing operating power of the network communications device based on the first digital receive-signal so as to promote connection quality; and
- (J) providing a far end crosstalk canceling signal based on the (m) digital receive-signals for canceling far end crosstalk in the first digital receive-signal, prior to step (G);
- wherein in step (G), the decoded signal is generated based on the first digital receive-signal subsequent to cancellation of the echo, the near end crosstalk and the far end crosstalk in the first digital receive-signal.

18. The network communications method as claimed in claim 17, wherein step (H) comprises increasing a transmitting power in at least one of steps (A) and (B) so as to promote connection quality.

19. The network communications method as claimed in claim 18, wherein step (H) comprises increasing a digital-to-analog conversion reference voltage value corresponding to the transmitting power so as to promote connection quality.

20. The network communications method as claimed in claim 17, wherein step (H) comprises increasing a receiving power in at least one of steps (C) and (D) so as to promote connection quality.

21. The network communications method as claimed in claim 20, wherein step (H) comprises increasing an analog-to-digital conversion reference current value corresponding to the receiving power so as to promote connection quality.

22. The network communications method as claimed in claim 17, wherein step (H) comprises increasing at least one an operating power utilized in providing the echo canceling signal in step (E) and an operating power utilized in providing the near end crosstalk canceling signal in step (F) so as to promote connection quality.

23. The network communications method as claimed in claim 22, wherein step (H) comprises increasing at least one of a number of operating taps utilized in providing the echo canceling signal and a number of operating taps utilized in providing the near end crosstalk canceling signal so as to promote connection quality.

24. The network communications method as claimed in claim 17, wherein step (H) comprises increasing an operating power for generating the decoding signal in step (G) so as to promote connection quality.

25. The network communications method as claimed in claim 17, further comprising the step prior to step (H) of:
- (I) estimating a cable length of a connecting cable between the network communications device and said another network communications device, and generating an estimation result;

wherein in step (H), the operating power of the network communications device is increased based on the estimation result so as to promote connection quality.

26. The network communications method as claimed in claim 17, wherein in step (H), a first signal-to-noise ratio is obtained based on the first digital receive-signal, and the operating power of the network communications device is subsequently increased based on the first signal-to-noise ratio so as to promote connection quality.

27. The network communications method as claimed in claim 17, wherein the network communications device supports data transmission rates of 10 Gigabits per second or higher.

28. The network communications method as claimed in claim 17, wherein a cable length of a connecting cable between the network communications device and said another network communications device is greater than one hundred meters.

29. The network communications method as claimed in claim 17, further comprising the step prior to step (H) of:
(L) comparing a signal quality of the first digital receive-signal with the signal qualities of the (m) digital receive-signals;
wherein when the signal quality of the first digital receive-signal is a poorest signal quality in comparison with the signal qualities of the (m) digital receive-signals, in step (H), the operating power of the network communications device is adjusted based on the poorest signal quality of the first digital receive-signal so as to promote connection quality.

30. The network communications method as claimed in claim 17, wherein (n) and (m) are both equal to three.

31. A network communications method capable of promoting connection quality and adapted for a network communications device, said network communications method comprising the following steps:
(A) outputting a first analog transmit-signal to another network communications device based on a first digital transmit-signal;
(B) outputting (n) analog transmit-signals to said another network communications device based on (n) digital transmit-signals, wherein (n) is a positive integer;
(C) outputting a first digital receive-signal based on a first analog receive-signal sent from said another network communications device;
(D) outputting (m) digital receive-signals based on (m) analog receive-signals sent from said another network communications device, wherein (m) is a positive integer;
(E) providing an echo canceling signal based on the first digital transmit-signal for canceling an echo in the first digital receive-signal;
(F) providing a near end crosstalk canceling signal based on the (n) digital transmit-signals for canceling near end crosstalk in the first digital receive-signal;
(G) generating a decoded signal based on the first digital receive-signal subsequent to cancellation of the echo and the near end crosstalk in the first digital receive-signal;
(H) increasing operating power of the network communications device based on the first digital receive-signal so as to promote connection quality; and
(K) confirming a transmitting/receiving power of said another network communications device so as to determine a connection mode, prior to step (H);
wherein in step (H), the operating power of the network communications device is increased based on the connection mode and the first digital receive-signal so as to promote connection quality.

32. The network communications method as claimed in claim 31, wherein the connection mode in step (K) is one of a 10 Megabits per second data transmission rate mode, a 100 Megabits per second data transmission rate mode, a 1 Gigabits per second data transmission rate mode, a 10 Gigabits per second data transmission rate mode, and an above 10 Gigabits per second data transmission rate mode.

* * * * *